United States Patent [19]

Maat

[11] Patent Number: 4,723,272
[45] Date of Patent: Feb. 2, 1988

[54] TELECOMMUNICATION SYSTEM, IN PARTICULAR TELEPHONE SYSTEM

[75] Inventor: Jan P. Maat, Hilversum, Netherlands

[73] Assignee: U.S. Philips Corporation, New York, N.Y.

[21] Appl. No.: 725,183

[22] Filed: Apr. 19, 1985

[30] Foreign Application Priority Data

May 7, 1984 [NL] Netherlands ............. 8401443

[51] Int. Cl.⁴ ............. H04M 7/00; H04M 3/54
[52] U.S. Cl. ............. 379/211; 379/229; 379/230; 370/62
[58] Field of Search ........ 179/18 EA, 18 BE, 27 CA, 179/8 R; 370/62; 379/207, 210, 211, 220, 221, 225, 230, 229

[56] References Cited

U.S. PATENT DOCUMENTS 4,160,130 7/1979 Marchetti et al. ............. 179/18 EA
4,278,844 7/1981 Jones ............. 179/18 BE
4,464,543 8/1984 Kline et al. ............. 179/8 R Primary Examiner—James L. Dwyer
Attorney, Agent, or Firm—Thomas A. Briody; Jack Oisher; William J. Streeter

[57] ABSTRACT

A telephone communication system comprising a plurality of intercoupled sub-systems each of which comprises a control-unit and at least one peripheral module to which multiple terminals are connected. The control-unit of each sub-system includes destination numbers identifying the terminals within the system, and from the destination number provided by a source terminal determines with which sub-system the destination terminal is associated. When the destination terminal sub-system differs from the source terminal sub-system, signalling information identifying the source terminal is transmitted to the control-unit of the destination terminal sub-system. The control-unit of the destination terminal sub-system then analyzes such information and establishes the connection to the destination terminal therein.

5 Claims, 5 Drawing Figures

TELECOMMUNICATION SYSTEM, IN PARTICULAR TELEPHONE SYSTEM

BACKGROUND OF THE INVENTION

1. Field of the Invention

The invention relates to a telecommunication system, in particular a telephone system comprising a plurality of intercoupled sub-systems, each sus-system comprising a switching system, a control-unit and at least one peripheral module, to which communication lines can be connected.

2. Description of the Prior Art

Such a telecommunication system is generally known. In a telecommunication network of sub-systems found in industrial telephone exchanges the network is normally composed of independent sub-systems, each of which manages the variable (and semi-variable) permanent data of its own connections. It is often unavoidable that each data system must also comprise "global net data" such as routing data and data concerning the presence or absence of teleprinters. Consistency problems may then occur when the network has to be approached as a whole by operational maintenance in order to change the data.

A further problem is that in distributing interrelated data about the sub-systems the data management becomes particularly complicated, for example, by relation variations. It may then also occur that data relating to connections must be derived from various places, which gives rise to delays and, moreover, brings about a higher input/output activity of the control-unit.

SUMMARY OF THE INVENTION

The invention has for its object to provide a telecommunication system of the kind set forth in the preamble by which effective and economic data management is created in a simple manner. The telecommunication system is characterized in that the control-unit of each sub-system has a list of the destination numbers inside the system, that on the basis of a destination number provided by a source connected to a peripheral module via a communication line, it is determined with which sub-system the destination is associated, which destination is connected to a peripheral module via a communication line, and that when the destination sub-system differs from the source sub-system the necessary (signalling) information about identity and characteristics of the source is transmitted to the control-unit of the destination system and the connection is passed on to the destination sub-system and in that the control-unit of the destination sub-system analyzes said information and, as the case may be, establishes the connection with the destination.

When the destination is to be diverted (for example in the case of a diversion because of non-response) the destination sub-system transfers, in accordance with the invention, the information about the new destination to the control-unit of the sub-system to which the new destination is associated through the control-unit of the source sub-system.

The invention also provides a method of outgoing call assistance by an operator in a sub-system other than the source terminal and destination terminal sub-systems.

It is advantageous for the sub-systems to be coupled with multiplex lines, which include at least one channel for transferring signalling information.

It is furthermore advantageous for said channel to be a 64k bit/s common channel signalling channel inside a 2 Mbit/s multiplex line.

BRIEF DESCRIPTION OF THE DRAWINGS

Embodiments of the invention and their advantages will be set out with reference to the accompanying drawings, in which corresponding elements are designated by the same reference symbols. In the drawings

DESCRIPTION OF THE PREFERRED EMBODIMENT

Figure 1:
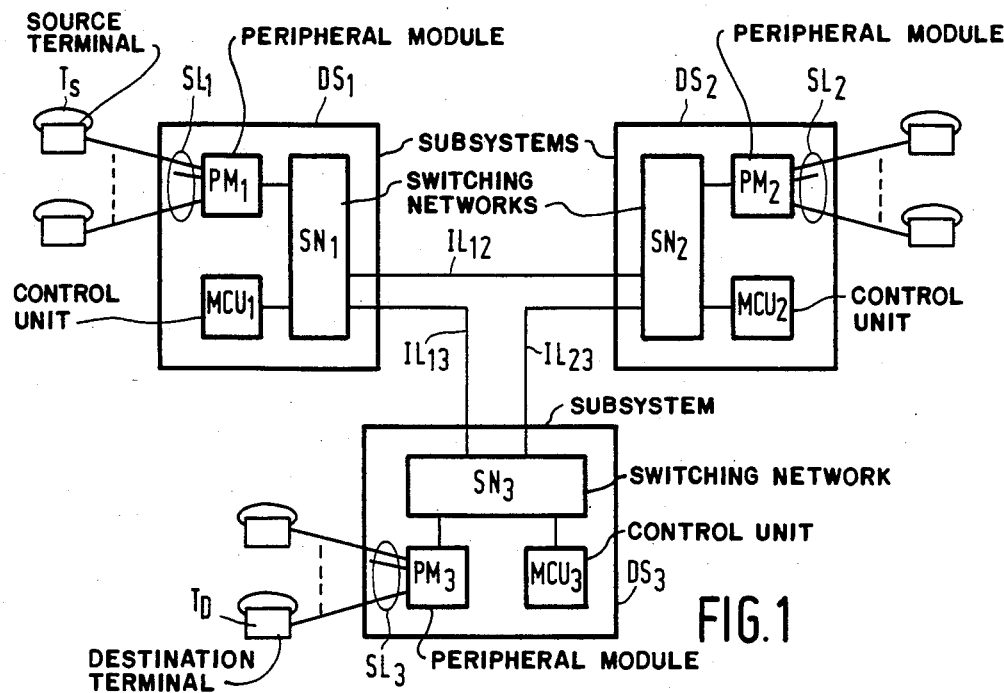
FIG. 1 is a block diagram of a telecommunication system embodying the invention and comprising three sub systems, FIG. 2 a block diagram of part of a telecommunication system for illustrating signalling a terminal in accordance with the invention, FIG. 3 a block diagram of part of a telecommunication system for illustrating ringing when diverting a connection in accordance with the invention, FIG. 4 a block diagram of part of a telecommunication system for illustrating the operator's handling of an outgoing connection in accordance with the invention, and FIG. 5 a block diagram of part of a telecommunication system for illustrating the operator's handling of an outgoing connection to a non-free terminal in accordance with the invention.

FIG. 1 shows a telecommunication system comprising three sub-systems $DS_1$, $DS_2$ and $DS_3$. The sub-systems are connected by intersystem-lines $IL_{12}$, $IL_{23}$ and $IL_{13}$. Each sub-system comprises a switching network SN and one or more peripheral modules PM serving to connect subscriber lines SL to the switching network SN concerned. Further more each sub-system comprises a control unit MCU, which is also connected to the switching network SN. To the subscriber lines may be connected a telephone set, a terminal, a graphical display unit or other terminal apparatus. Depending on the size of the system the system may comprise a single T stage or a TST (in general a TnST) network.

The establishment of a connection between two terminals connected to the system takes place as follows. If a terminal $T_S$, the source terminal connected to sub-system $DS_1$, desires a connection to terminal $T_D$, the destination terminal connected to sub-system $DS_3$, the desired connection of the source is announced - in a further conventional manner - through the peripheral module $PM_1$ to the switching network $SN_1$ to the control-unit $MCU_1$ of the sub-system $DS_1$. The characteristics and the identity of the source and the identity of the destination are determined in the control-unit $MCU_1$. It is in particular determined to which sub-system the destination is connected. For this purpose each control-unit has a list indicating which terminal numbers are associated with which sub-systems. If it is found that the destination is in a different sub-system—in this example the destination being in sub-system $DS_3$—the control-unit $MCU_1$ of the first sub system $DS_1$ transfers the required information about the identity and characteristics of source and destination to the processing unit of the sub-system with which the destination is associated ($MCU_3$). The transfer of this information is performed through the intersystem lines interconnecting the sub-systems, in this example the intersystem line $IL_{13}$. In addition the connection between the source and the destination sub-system is established which means that a path is created from terminal $T_S$ via peripheral modules $PM_1$, through switching network $SN_1$ and via intersystem line $IL_{13}$ to the switching network $SN_3$ of sub-system $S_3$. In sub-system $DS_3$ a connection is then established between the destination $T_D$ and the appropriate input of the switching system $SN_3$. The establishment of this connection is in fact, for the sub-system $SN_3$ nothing else than the establishment of a connection between two parts (source an destination) connected, so to say, to the same sub-system, since the sub-system itself contains all information required for making the connection with that sub-system and owing to the further switching of the source sub-system the source is, so to say, displaced to an input of the destination sub-system.

The intersystem lines may be multiplex lines having a transmission capacity of 2 M bit/s, subdivided into 32 channels of 64k bit/s each. One (or more) of these channels is (are) reserved for the transmission of the (signalling) information.

Although FIG. 1 shows three sub-systems, the invention is not limited thereto; it may be fewer or more than three systems. It is also possible of the inter-system lines to be formed by a bundle of two or more parallel lines. Moreover, complete interconnectability is not strictly necessary.

The features of the invention will now be described more fully with reference to a few practical situations.

Figure 2:
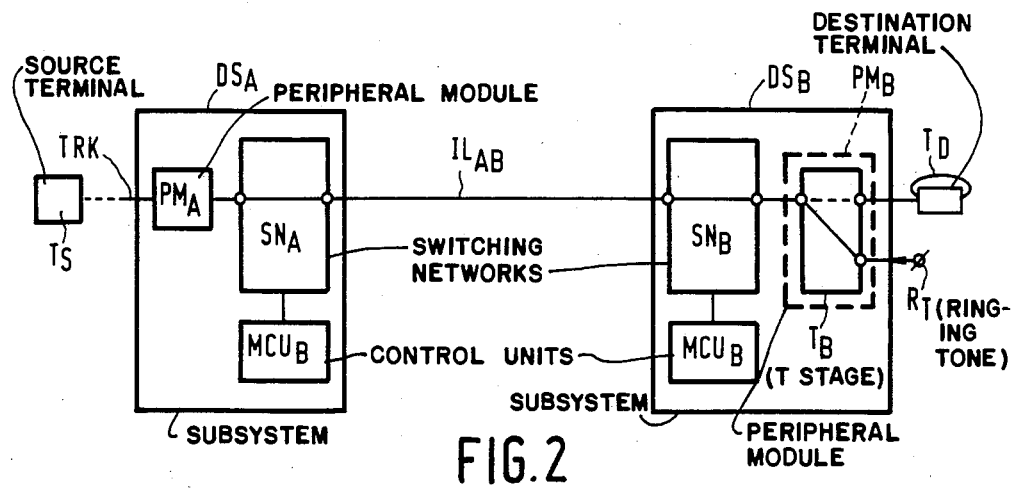

FIG. 2 shows the interconnection operation for a trunk line TRK (connected to source terminal TS), which is connected through the peripheral module $PM_A$ of the sub-network $DS_A$, the switching system $SN_A$ and the intersystem line $IL_{AB}$ to the switching network $SN_B$ of sub-system $DS_B$. After the control-unit $MCU_B$ of the sub-system $DS_B$ has assessed that the destination terminal $T_D$ is "free", the T stage $T_B$ forming part of the peripheral module $PM_B$ of the sub-system $DS_B$ applies from an input RT a ringing tone to the source $T_S$. The destination T stage itself provides the ringing tone to the destination terminal $T_D$. The responce destination terminal $T_D$ is then connected to the T stage of the peripheral module $PM_B$ and is switched on (indicated by broken lines in FIG. 2) so that at the same time the ringing tone for the two parties is interrupted.

Figure 3:
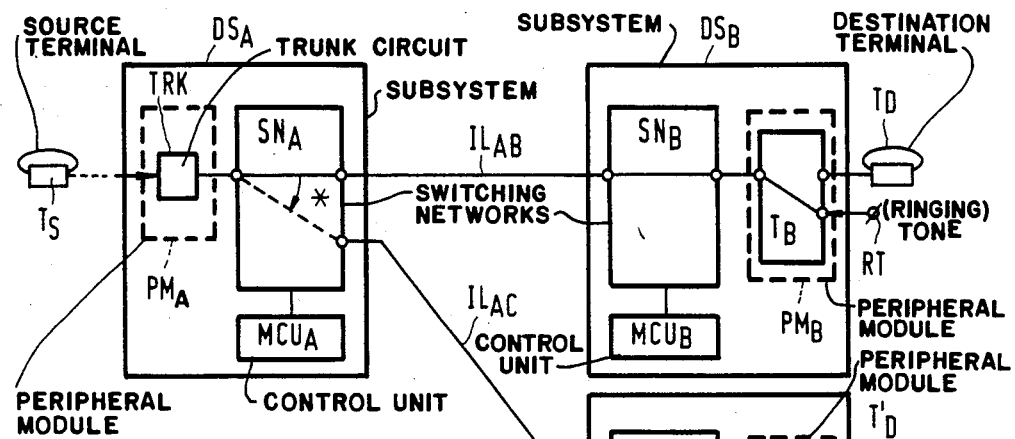

If during ringing the destination terminal $T_D$ has to be changed over in the case of non-response to another destination terminal $T'_D$, which is associated with a different sub-system $DS_C$, a situation as illustrated in FIG. 3 occurs. Through input RT of the T stage of peripheral module $PM_B$ the source terminal $T_S$ is uninterruptly rung. The control unit $MCU_B$ of sub-system $DS_B$ transmits the new location of the destination terminal $T'_D$ to the control-unit $MCU_A$ of the source system $DS_A$. This control-unit ($MCU_A$) transfers through the intersystem line $IL_{AC}$ the (signalling) information to the sub-system $DS_C$ with which the destination $T'_D$ is associated and then switches further connection to that sub-system. The sub-system $DS_C$ emits ringing current to destination terminal $T'_D$. When the destination terminal $T'_D$ responds, the reply signal is rapidly transferred to the sub-system $DS_A$, after which in the switching network of the source system $DS_A$ a change-over takes place to the connection indicated by broken line. In the T stage of the peripheral module $PM_C$ of the destination sub-system $DS_C$ the connection indicated by broken line is established. An advantage of this way of ringing is that the rhythm of the ringing tone for the source terminal $T_S$ remains unvaried, since the ringing tone continues emanating from the sub-system $DS_B$.

Figure 4:
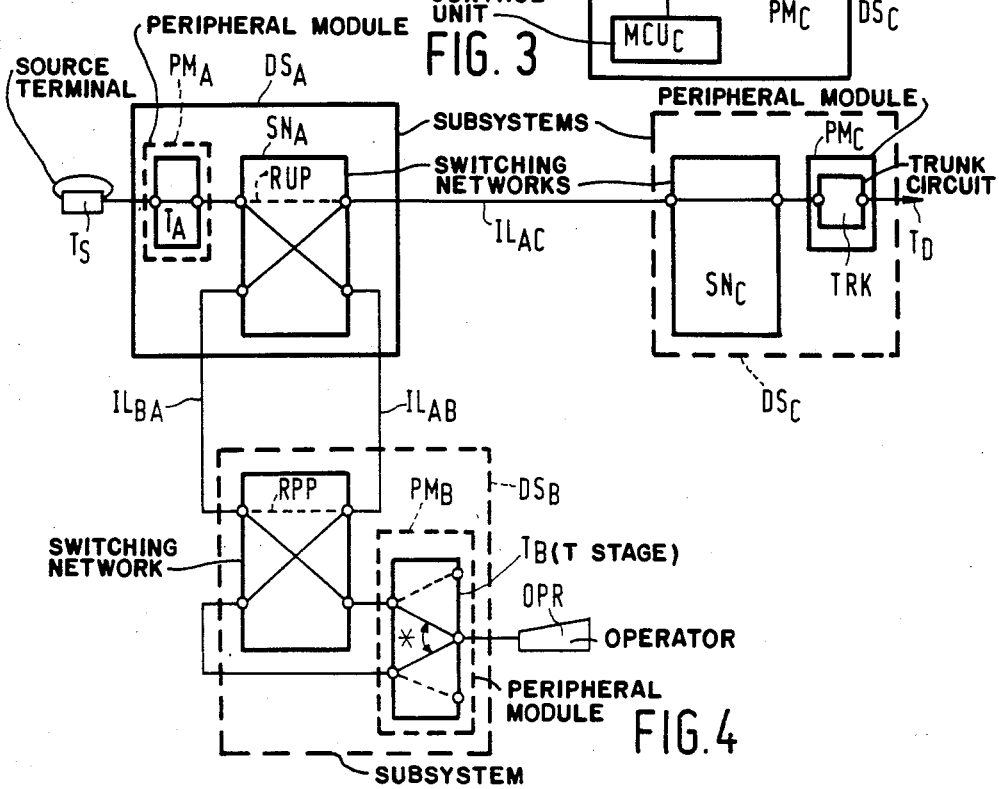

FIG. 4 illustrates the outgoing call assistance by an operator. The terminal $T_S$ and the source sub-system $DS_A$ desire an outgoing (trunk) connection. In principle, the three parties concerned i.e. the source, the destination and the desired trunk may be located in three different sub-systems. The control-unit of the sub-system $DS_A$, with which the terminal $T_S$ is associated, transmits in the manner described above the (signalling) information to the control-unit of the sub-system $DS_B$ with which an operator OPR is associated. The connection is switched on so that the operator can communicate with terminal $T_S$ through the T stage $T_A$ of the peripheral module $PM_A$ of the source sub-system $DS_A$, in a path through switching network $SN_A$, the intersystem line $IL_{AB}$, a path through the switching network $SN_B$ of the sub-system $DS_B$ with which the operator is associated, the T stage $T_B$ of said sub-system and the operator. The operator will then establish a connection to an outgoing trunk circuit TRK through the source sub-system $DS_A$ to the sub-system $DS_C$ with which is associated the destination $T_D$. In other words there is not established a direct connection from sub-system $DS_B$ to sub-system $DS_C$. Instead this connection is formed by a path through the T stage $T_B$ of the peripheral module $PM_B$, to which the operator is connected, by a path through switching system $SN_B$, the intersystem line $IL_{BA}$, a path through the switching system $SN_A$, the intersystem line $IL_{AC}$, a path through switching system $SN_C$ and finally through the trunk circuit TRK to the destination $T_D$. Upon response by the destination $T_D$ the dotted connection RUP (reserved ultimate path) is made in the switching system $SN_A$ of the source sub-system $DS_A$. It is also possible to switch in two steps: upon responce by the destination $T_D$ first a dotted connection RPP (reserved provisional path) can be made in the operator sub-system $DS_B$ effectively short-circuiting the connections to operator sub-system $DS_B$ and only then the connection RUP is made in the source sub-system $DS_A$. An advantage of this manner of establishing an outgoing connection is that the connections are made so that the final condition is as simple as possible. Moreover, rapid response to the operator handling is thus ensured.

Although the Figure shows two different intersystem lines between the sub-systems $DS_A$ and $DS_B$ (i.e. $IL_A$-$B$ and $IL_{BA}$) this is not necessary; the connection may be formed either by two channels on one multiplex line or by one channel on such a line designed for two direction traffic. Moreover, as stated above, the intersystem lines include one or more common channel signalling channels and a number, for example, 30 of communication channels.

Figure 5:
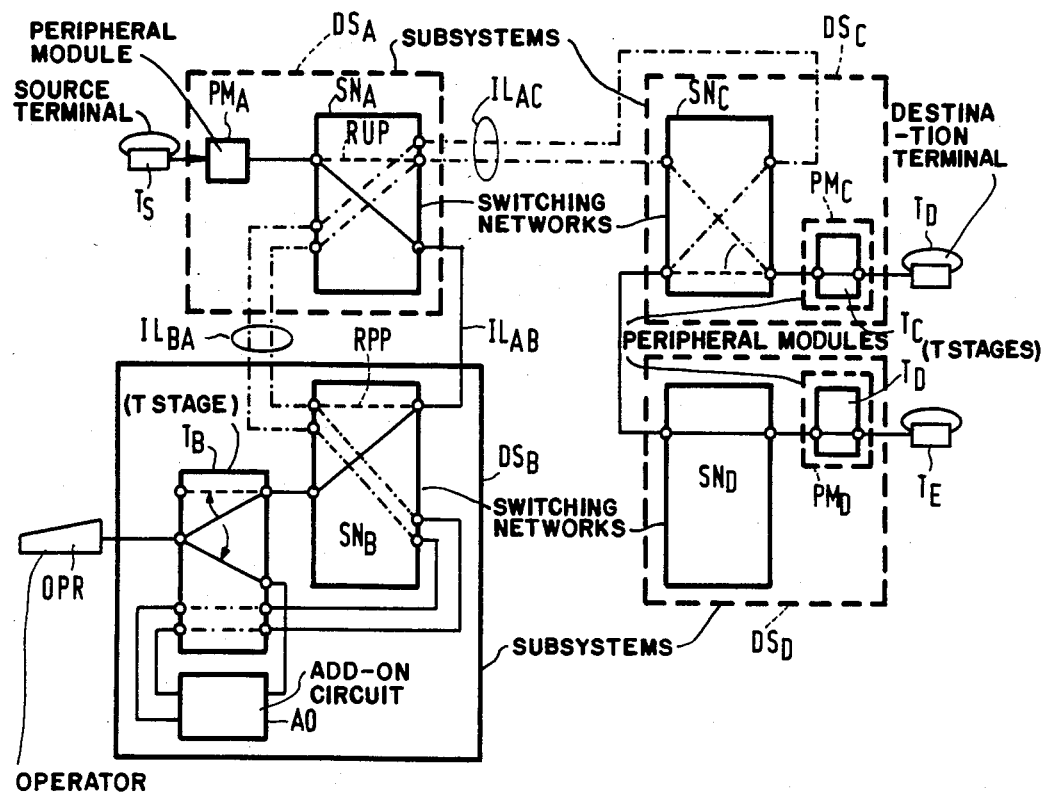

FIGS. 4 and 5 omit the control units which are part of each sub-system in order to avoid unnecessary complication of the Figures. Each sub-system comprises such a control-unit connected in the manner described in FIGS. 1 to 3.

FIG. 5 shows a situation as in FIG. 4, in which the destination terminal $T_D$ is not "free", but is communicating with a third terminal $T_E$ associated with a further sub-system $DS_D$. The connection is then established as follows First as described above with reference to FIG. 4, a connection is made between the sub-system $DS_A$ and the operator sub-system $DS_B$. Then the operator makes a connection both to the destination sub-system $DS_C$ and to the terminal $T_E$ associated with the sub-system $DS_D$ communicating with that destination. For this purpose through a path in the T stage $T_B$ of the peripheral module to which the operator is connected, the operator makes a connection to "add-on circuit AO". From the add-on circuit AO connections are made to the destination sub-system $DS_C$ and to the third sub-system $DS_D$ both such connections being made indirectly through the source sub-system $DS_A$. The connection of the operator to the destination sub-system $DS_C$ is via T stage $T_B$, the switching network $SN_B$, the intersystem line $IL_{BA}$, the switching network $SN_A$, intersystem line $IL_{AC}$, switching network $SN_C$, T stage $T_C$ to the destination terminal $T_D$. The connection of the operator to the third sub-system $DS_D$ is passed for a large part through the same route i.e. through T state $T_B$, switching system $SN_B$, intersystem line $IL_{BA}$, switching network $SN_A$, intersystem line $IL_{AC}$, switching network $SN_{C1}$, switching network $SN_D$, T stage $T_D$, a third terminal $T_E$. The operator then has the possibility to communicate simultaneously with the two terminals ($T_D$ and $T_E$) and with terminal $T_S$ separately. When the connection between terminals $T_D$ and $T_E$ is terminated then in switching system $SN_A$ in source sub-system $DS_A$ the path RUP (indicated by dashes) is connected further so that the connection between source terminal $T_S$ and destination terminal $T_D$ becomes established. It is also possible to attain this connection of source and destination in two phases i.e., by first in the switching system $SN_B$ of the operator sub-system $DS_B$ the path RPP (indicated by dashes) is made and only then the path RUP in switching system $SN_A$.

The advantage of this manner of correction is that the final routing condition is as simple as possible.

It is obvious that the telecommunication system is suitable not only for transmitting call signals but also for carrying out also all kinds of data traffic.

What is claimed is:

1. A telephone communication system comprising a plurality of intercoupled sub-systems, each sub-system comprising a switching network, a control-unit and a peripheral module which can be connected by communication lines to a plurality of source and destination terminals identified by destination numbers; wherein the control-unit of each sub-system includes a list of such destination numbers of all terminals in the entire system and of the sub-systms with which they are associated, and on the basis of a destination number provided by a source terminal connected to a peripheral module in any sub-system the control unit in such sub-system determines with which sub-system the destination terminal is associated; and wherein when the destination terminal sub-system differs from the source terminal sub-system signalling information identifying the source terminal is transmitted from the control unit of the source terminal sub-system to the control-unit of the destination terminal sub-system and connection is made of the source terminal to the destination terminal sub-system, and the control-unit of the destination terminal sub-system analyzes such signalling information and establishes connection to the destination terminal therein.

2. A system as claimed in claim 1, wherein when the first destination terminal is to be diverted to a new destination terminal by the first destination terminal sub-system, and information identifying such new destination terminal is transmitted by the control unit of the first destination terminal sub-system through the control unit of the source terminal sub-system to the control unit of the subsystem with which the new destination terminal is associated.

3. A system as claimed in claim 1 wherein the sub-systems are coupled by multiplex lines including at least one channel for transmitting information.

4. A system as claimed in claim 3, characterized in that said channel is a 64k bit/s common channel signalling channel inside a 2 M bit/s multiplex line.

5. A process of outgoing call assistance by an operator in a system as claimed in claim 1, such operator being associated with a sub-system other than the source terminal and destination terminal sub-systems, such process consisting of the steps of: making a first connection of the source terminal sub-system to the operator sub-system; making a second connection of the operator sub-system through the source terminal sub-system to the destination terminal sub-system; and, upon response by the destination terminal, completing a connection between the source terminal and the destination terminal by shortcircuiting said connections to the operator sub-system.

* * * * *